US012381352B2

(12) United States Patent
Matsuoka et al.

(10) Patent No.: US 12,381,352 B2
(45) Date of Patent: Aug. 5, 2025

(54) CONNECTOR UNIT, WIRE HARNESS, AND CONNECTOR FITTING STRUCTURE

(71) Applicants: SUMITOMO WIRING SYSTEMS, LTD., Yokkaichi (JP); TOYOTA JIDOSHA KABUSHIKI KAISHA, Toyota (JP)

(72) Inventors: Hiroyuki Matsuoka, Yokkaichi (JP); Ayumu Ohira, Yokkaichi (JP); Yoshimasa Tanuma, Yokkaichi (JP); Yuki Ohira, Toyota (JP); Takenori Tsuchiya, Toyota (JP)

(73) Assignees: SUMITOMO WIRING SYSTEMS, LTD., Yokkaichi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 286 days.

(21) Appl. No.: 17/995,587

(22) PCT Filed: Apr. 8, 2021

(86) PCT No.: PCT/JP2021/014849

§ 371 (c)(1),
(2) Date: Oct. 6, 2022

(87) PCT Pub. No.: WO2021/206130

PCT Pub. Date: Oct. 14, 2021

(65) Prior Publication Data

US 2023/0163519 A1 May 25, 2023

(30) Foreign Application Priority Data

Apr. 10, 2020 (JP) ................................ 2020-071254

(51) Int. Cl.
*H01R 13/52* (2006.01)
*H01R 13/641* (2006.01)
(Continued)

(52) U.S. Cl.
CPC ..... *H01R 13/5221* (2013.01); *H01R 13/5213* (2013.01); *H01R 13/641* (2013.01); *H01R 43/20* (2013.01); *H01R 43/26* (2013.01)

(58) Field of Classification Search
CPC ............ H01R 13/5221; H01R 13/5213; H01R 13/641; H01R 13/62; H01R 13/52; H01R 13/73; H01R 43/20; H01R 43/26
(Continued)

(56) References Cited

U.S. PATENT DOCUMENTS 5,320,544 A * 6/1994 Naoto .............. H01R 13/62938 439/157
5,474,465 A * 12/1995 Kobayashi ......... H01R 13/5219 439/372
(Continued)

FOREIGN PATENT DOCUMENTS

JP S52060690 U 5/1977
JP 2011044303 A 3/2011
(Continued)

*Primary Examiner* — Gary F Paumen

(57) ABSTRACT

A connector unit comprises: a connector that has terminals connected to terminal parts of electric wires, and a housing that holds the terminals; and a cylindrical connector cover that is formed from an elastic material and that covers the housing. The connector cover has an annular seal part provided at a position at which it is possible to contact a mating connector-side surface in a fitted state with the mating connector.

9 Claims, 12 Drawing Sheets

(51) Int. Cl.
*H01R 43/20* (2006.01)
*H01R 43/26* (2006.01)

(58) Field of Classification Search
USPC .......................................................... 439/278
See application file for complete search history.

(56) References Cited

U.S. PATENT DOCUMENTS

| | | | | |
|---|---|---|---|---|
| 5,913,691 | A * | 6/1999 | Clark ................... | H01R 13/641<br>439/157 |
| 6,036,509 | A * | 3/2000 | Maejima .......... | H01R 13/62905<br>439/157 |
| 6,056,565 | A * | 5/2000 | Sawayanagi ..... | H01R 13/62905<br>439/157 |
| 6,155,849 | A * | 12/2000 | Kodama .......... | H01R 13/62905<br>439/157 |
| 6,293,813 | B1 * | 9/2001 | Johnston .......... | H01R 13/62905<br>439/157 |
| 6,447,312 | B1 * | 9/2002 | Takata ............. | H01R 13/62938<br>439/372 |
| 6,592,384 | B2 * | 7/2003 | Sawayanagi ....... | H01R 13/5202<br>439/157 |
| 9,680,256 | B1 | 6/2017 | Lane et al. | |
| 2003/0017739 | A1 | 1/2003 | Sawayanagi | |

FOREIGN PATENT DOCUMENTS

| | | | |
|---|---|---|---|
| JP | 2011154984 | A | 8/2011 |
| JP | 2017010754 | A | 1/2017 |

* cited by examiner

CONNECTOR UNIT, WIRE HARNESS, AND CONNECTOR FITTING STRUCTURE

BACKGROUND

Field of the Disclosure

The present disclosure relates to a connector unit, a wire harness, and a connector fitting structure.

Related Art

Connectors are used to electrically connect in-vehicle devices. One type of such a known connector is a connector unit including a connector cover that encloses a connector and is formed from an elastic material. Japanese Laid-Open Patent Publication No. 2011-44303 (JP'303) discloses a structure in which a rubber boot, serving as a connector cover, covers a housing and the electric wires extending out of the housing. Such a connector cover is structured to cover the housing of the connector and the electric wires. This effectively protects the housing and electric wires accommodated in the connector cover from water, heat, and the like.

SUMMARY

In the connector unit described in JP'303, the connector cover merely covers the housing. Thus, it is required that the water resistance be improved in the portion of the connector that is fitted to a mating connector so that the connector can be used at a location that is likely to be exposed to water.

Accordingly, the present disclosure discloses a connector unit, a wire harness, and a connector fitting structure that are novel and improve water resistance at an area including a portion fitted to a mating connector.

A connector unit in accordance with the present disclosure includes a connector and a tubular connector cover. The connector includes a terminal fitting that is connected to a terminating end portion of an electric wire and a housing that holds the terminal fitting. The connector cover covers the housing and is formed from an elastic material. The connector cover includes a looped seal portion, and the looped seal portion is arranged at a position allowing for contact with a surface of a mating connector in a state fitted to the mating connector.

A wire harness according to the present disclosure includes a connector unit and an electric wire connected to the terminal fitting of the connector unit.

A connector fitting structure in accordance with the present disclosure includes a connector unit and a mating connector fitted to the connector unit. The looped seal portion of the connector unit contacts a surface of the mating connector in a state in which the connector unit is fitted to the mating connector.

The present disclosure provides a connector unit, a wire harness, and a connector fitting structure that improve water resistance at an area including a portion fitted to a mating connector.

DETAILED DESCRIPTION

Description of Embodiments of Present Disclosure

Figure 1:
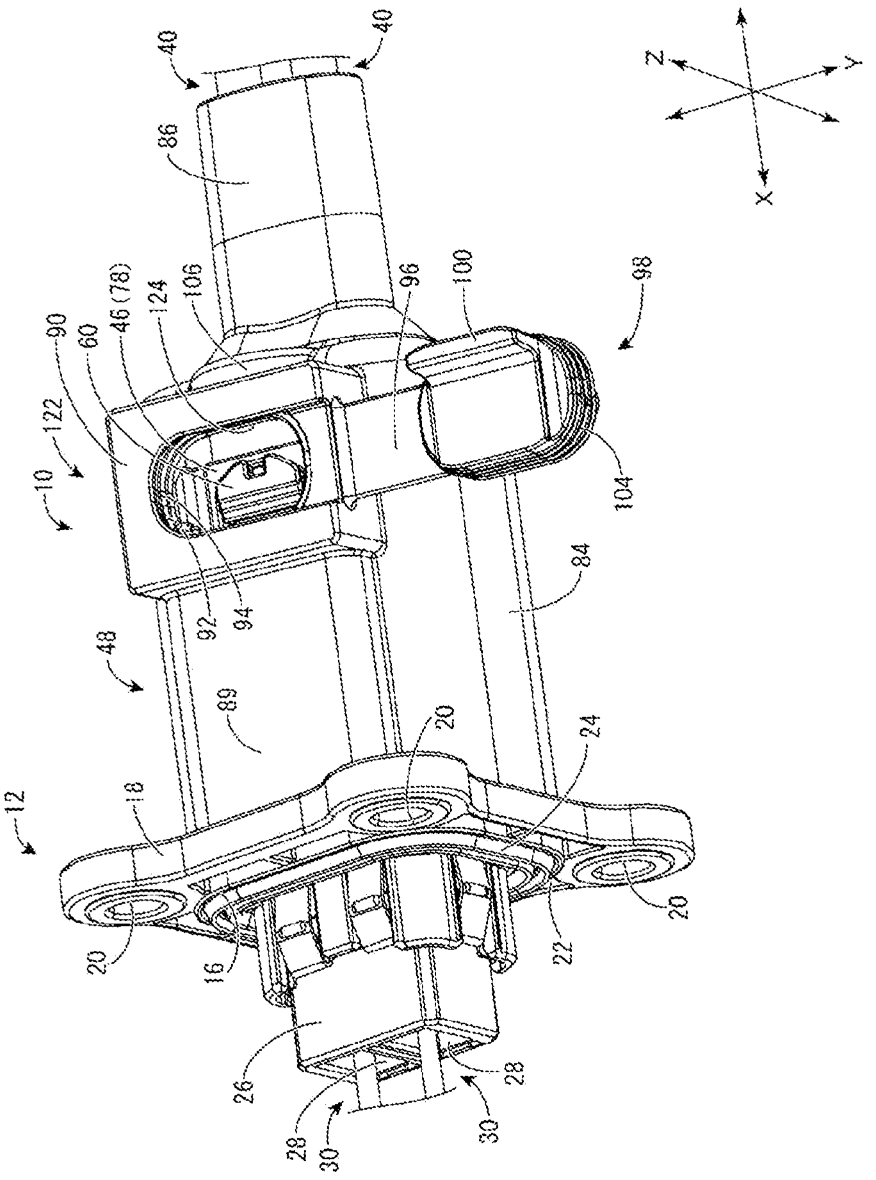
FIG. 1 is a perspective view showing a state in which a mating connector is coupled to a connector unit according to a first embodiment of the present disclosure.

First, embodiments of the present disclosure will be listed and described.

Connector Unit in Accordance with Present Disclosure (1) A connector unit includes a connector and a tubular connector cover. The connector includes a terminal fitting that is connected to a terminating end portion of an electric wire and a housing that holds the terminal fitting. The connector cover covers the housing and is formed from an elastic material. The connector cover includes a looped seal portion, and the looped seal portion is arranged at a position allowing for contact with a surface of a mating connector in a state fitted to the mating connector.

With the connector unit in accordance with the present disclosure, the looped seal portion is arranged at a position allowing for contact with a surface of a mating connector in a state fitted to the mating connector. More specifically, the looped seal portion arranged on the connector cover is located at an outermost part of the edge of the connector unit. The looped seal cover contacts a surface of a mating connector to seal the gap between the connector cover and the surface of the mating connector. This improves water resistance at the side of the connector unit fitted to the mating connector. Further, when in use, the looped seal portion of the connector cover will stop foreign matter such as mud collected around the connector cover from entering the connector cover. Thus, during maintenance or the like, when fitting or removing the connector unit to or from the mating connector, foreign matter will not enter the housing. Accordingly, defects that may be caused by such foreign matter will not occur when refitting the connector unit to the mating connector.

(2) Preferably, the looped seal portion has a tapered shape so as to be enlarged in diameter toward the mating connector. The looped seal portion has a tapered shape. Thus, the distal end of the looped seal portion is enlarged in a direction extending away from the center axis of the looped seal portion when contacting the surface of the mating connector. This increases the area of contact with the surface of the mating connector and improves the seal of the looped seal portion.

(3) Preferably, the connector cover includes a positioning portion that positions the connector cover on the housing, and the positioning portion contacts the housing to position the connector cover. The housing and the cover are easily coupled to each other at the proper position by having the positioning portion of the connector contact the housing. When fitted to the mating connector, the looped seal portion can easily contact the surface of the mating connector.

(4) Preferably, the connector includes a connector position assurance component assuring proper fitting to the mating connector, and the connector cover includes a window that exposes the connector position assurance component to the outside of the connector cover and a lid that freely opens and closes the window. The connector cover, which covers the housing, includes a window that exposes the connector position assurance component to the outside of the connector cover. Thus, the connector position assurance component arranged on the housing is visible and can be checked through the window of the connector cover even when the connector cover is attached to the connector. In addition, the connector cover includes the lid that closes the window. This improves the water resistance and the like of the connector cover while obtaining a protective functionality.

(5) Preferably, the window has an inner edge surface that includes a ridge, the lid has an outer edge surface that contacts the inner edge surface and includes a valley, the ridge projects toward the outer edge surface, and the valley accommodates the ridge in a state contacting the ridge. Contact of the ridge and valley improves the seal between the contacting surfaces of the lid and the window and improves the water resistance of the connector cover. This also limits unexpected separation of the lid from the window.

(6) Preferably, the connector cover includes a first end, including the looped seal portion, and a second end, at a side opposite the first end. The second end of the connector cover includes an electric wire passage tube through which the electric wire connected to the terminal fitting extends, and the electric wire passage tube includes an inner surface that is in tight contact with an outer surface of the electric wire. The looped seal portion provides the connector cover with water resistance at the side of the first end. Contact of the inner surface of the electric wire passage tube with the outer surface of the electric wire provides the connector cover with water resistance at the side of the first end. This further improves the water resistance of the connector cover.

(7) Preferably, the terminal fitting held by the housing includes a plurality of terminal fittings, the electric wire includes a plurality of electric wires, the electric wires are connected to the terminal fittings and extend through the electric wire passage tube of the connector cover, the electric wire passage tube includes a partition wall located between the electric wires and arranged on the inner surface, the partition wall includes a projecting end that is separable from the inner surface, and the partition wall defines a passage region that contacts outer surfaces of each of the electric wires passing therethrough. The electric wire passage tube includes the partition wall located between the electric wires and arranged on the inner surface. The partition wall defines a passage region that contacts outer surfaces of each of the electric wires passing therethrough. This avoids interference between the electric wires. Interference refers to a state in which the electric wires contact each other. Further, each electric wire is stably held in the electric wire passage tube. In addition, the partition wall located between the electric wire closes gaps between the electric wires. This provides water resistance between the electric wires which would be an issue when passing the electric wires through the electric wire passage tube. Further, the projecting end of the partition wall is separable from the inner surface. Thus, the arrangement and passage of the electric wires through the electric wire passage tube can be performed using the electric wire passage tube as an electric wire passage tube that includes a single electric wire passage conduit. This facilitates the passage of each electric wire through the electric wire passage region.

(8) Preferably, a tying member is fixed to the electric wire passage tube. The tying member has the inner surface of the electric wire passage tube contact the outer surface of the electric wire. Contact of the inner surface of the electric wire passage tube with the outer surfaces of the electric wires further improves the water resistance of the electric wire passage tube.

Wire Harness in Accordance with Present Disclosure (9) A wire harness according includes a connector unit and an electric wire. The connector unit includes a connector and a tubular connector cover. The connector includes a terminal fitting that is connected to a terminating end portion of the electric wire and a housing that holds the terminal fitting. The connector cover covers the housing and is formed from an elastic material. The connector cover includes a looped seal portion, and the looped seal portion is arranged at a position allowing for contact with a surface of a mating connector in a state fitted to the mating connector. The electric wire is connected to the terminal fitting of the connector unit.

The wire harness according to the present disclosure includes the connector unit described above in paragraph (1) and thus has the same advantages as the connector unit described in paragraph (1).

Connector Fitting Structure in Accordance with Present Disclosure

(10) A connector fitting structure includes the connector unit according to any one of paragraphs (1) to (8) and a mating connector fitted to the connector unit. The looped seal portion of the connector unit contacts a surface of the mating connector in a state in which the connector unit is fitted to the mating connector.

The connector fitting structure according to the present disclosure includes the connector unit according to any one of paragraphs (1) to (8) and a mating connector fitted to the connector unit. The looped seal portion of the connector unit contacts a surface of the mating connector in a state in which the connector unit is fitted to the mating connector. This improves water resistance at the portion where the connector unit is fitted to the mating connector. Further, when in use, the looped seal portion of the connector cover in the connector unit will stop foreign matter such as mud collected around the connector cover from entering the connector cover. Thus, during maintenance or the like, when fitting or removing the connector unit to or from the mating connector, since foreign matter will not enter the housing of the connector unit, defects caused by such foreign matter will not occur when refitting the connector unit to the mating connector.

An embodiment of a connector unit, a wire harness, and a connector fitting structure will now be described with reference to the drawings. The present disclosure is not limited to these examples and is intended to include all modifications described by the scope of claims and corresponding to equivalents of the scope of claims.

A first embodiment of the present disclosure will now be described with reference to FIGS. 1 to 11. FIG. 1 is a perspective view showing a state in which a mating connector 12 is coupled to a connector unit 10 according to a first embodiment of the present disclosure. The mating connector 12, to which the connector unit 10 is coupled, is fixed to a case or the like of an electric device such as an inverter (not shown). With regard to the X, Y, and Z axes indicated in the drawings, the X-axis direction is the lengthwise direction of the connector unit 10, the Y-axis direction is the widthwise direction of the connector unit 10, and the Z-axis direction is the vertical direction. Identical components in the drawings will not all be denoted with a reference character, that is, only representative ones of identical components will be denoted with reference characters.

Mating Connector 12

Figure 2:
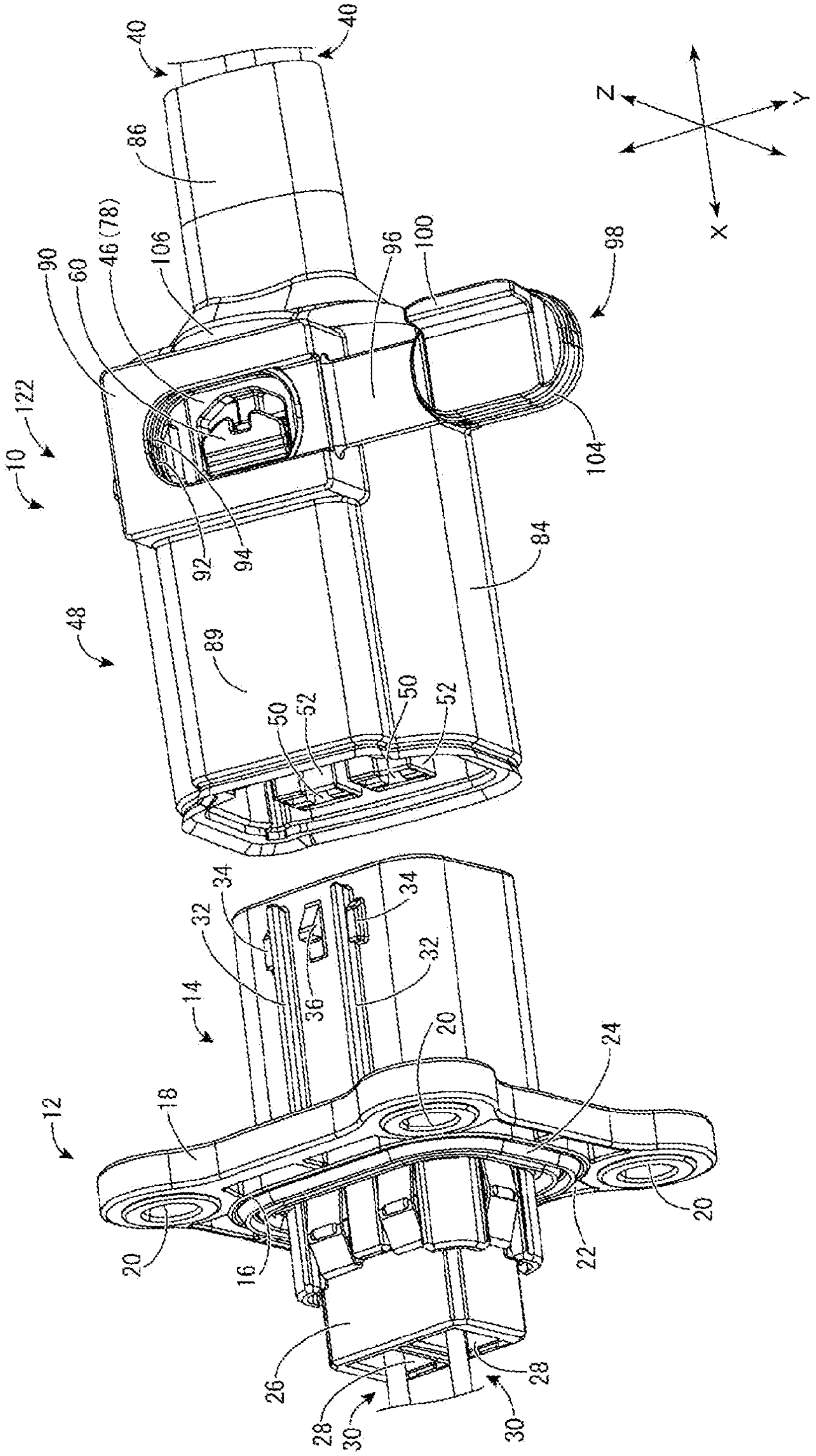
FIG. 2 is an exploded perspective view of the connector unit and the mating connector shown in FIG. 1.

As shown in FIG. 2, the mating connector 12 includes a mating connector housing 14. The mating connector housing 14 is formed from a synthetic resin. As shown in FIG. 2, the mating connector housing 14 has the form of a polygonal tube and is arranged so as to be open toward the front in the lengthwise direction (one side in X-axis direction) and toward the rear in the lengthwise direction (toward other side in X-axis direction). The lengthwise direction (X-axis direction in drawing) is the direction in which the connector unit 10 is attached to and detached from the mating connector 12. More specifically, the phrase toward the front in the lengthwise direction means the direction in which the connector unit 10 is moved when fitting the connector unit 10 to the mating connector 12. A fixed portion 18 is formed on the front side of the mating connector housing 14. The fixed portion 18 is a flange projecting outward in a direction orthogonal to the center axis of the mating connector housing 14 from the rim of a front open portion 16. The fixed portion 18 has the form of a rectangular plate in a front view taken from the front side with respect to the lengthwise direction. A through hole 20 having a circular cross-section extends through each of the four corners of the fixed portion 18 in a thickness-wise direction. Bolts are inserted through the through holes 20 of the fixed portion 18 to fix the mating connector housing 14 to a case of the electric device (not shown). A ring-shaped rubber seal 24 is attached to a front surface 22 of the fixed portion 18 in tight contact with the case and shield of the electric device (not shown). This limits the entry of water and dust into the electric device (not shown).

Further, as shown in FIG. 2, mating connector electric wire insertion portion 26 is arranged inside the front open portion 16 of the mating connector housing 14. The mating connector electric wire insertion portion 26 is coupled to the edge of the front open portion 16 and projected frontward. The mating connector electric wire insertion portion 26 has the form of a polygonal tube. The projecting end of the mating connector electric wire insertion portion 26 includes two mating connector electric wire passage conduits 28 that are separated from each other in the widthwise direction. The two mating connector electric wire passage conduits 28 are open toward the front and rear. The two mating connector electric wire passage conduits 28 each have a rectangular cross section. As shown in FIGS. 1 and 2, mating connector terminal fittings crimped to terminating end portions of terminal fitting-added electric wires 30 are inserted through the two mating connector electric wire passage conduits 28, respectively.

Figure 5:
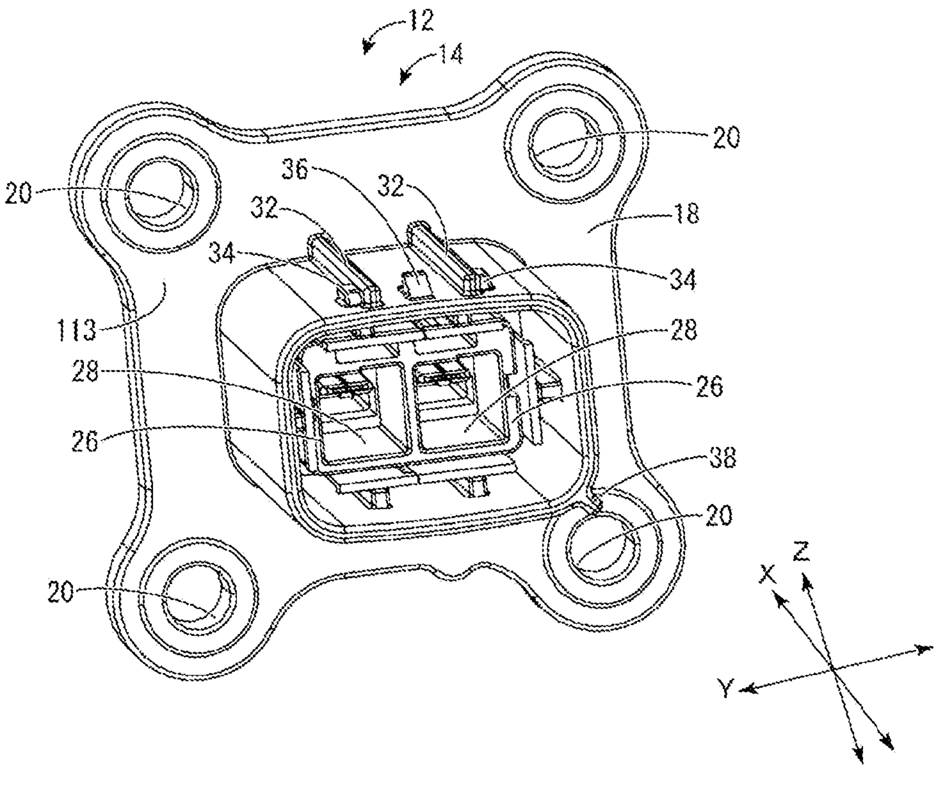
FIG. 5 is a rear perspective view of the mating connector shown in FIG. 2.

In addition, as shown in FIG. 2, two rails 32 are arranged on the outer upper surface of the mating connector housing 14 at a central portion in the widthwise direction (Y-axis direction as viewed in the drawing). The two rails 32 extend over substantially the entire length in the lengthwise direction and are separated from each other in the widthwise direction. The widthwise direction (Y-axis direction as viewed in the drawing) is the left-right direction in a view of the connector unit 10 taken from the front or rear in a state in which the Z-axis direction in the drawing corresponds to the vertical direction. An engagement projection 34 is formed on the rear side of each rail 32 with respect to the lengthwise direction. The engagement projections 34 have trapezoidal cross sections and extend in the widthwise direction from the sides of the rails 32 facing away from each other. An engagement protrusion 36 is formed between the rear sides of the rails 32 with respect to the lengthwise direction. The engagement protrusion 36 has a substantially triangular cross section in the widthwise direction. The front surfaces of the engagement projections 34 and the engagement protrusion 36 with respect to the lengthwise direction are vertical surfaces extending upward in the vertical direction. The rear surfaces of the engagement projections 34 and the engagement protrusion 36 are sloped surfaces extending diagonally downward. Further, as shown in FIG. 5, a rail 38 is arranged on the lower outer surface of the mating connector housing 14 toward one side (farther side) with respect to the widthwise direction. The rail 38 projects diagonally downward over the entire length in the lengthwise direction. The two rails 32 and the rail 38 are formed at different positions or with different dimensions for each type of the mating connector 12.

Connector Unit 10

Figure 3:
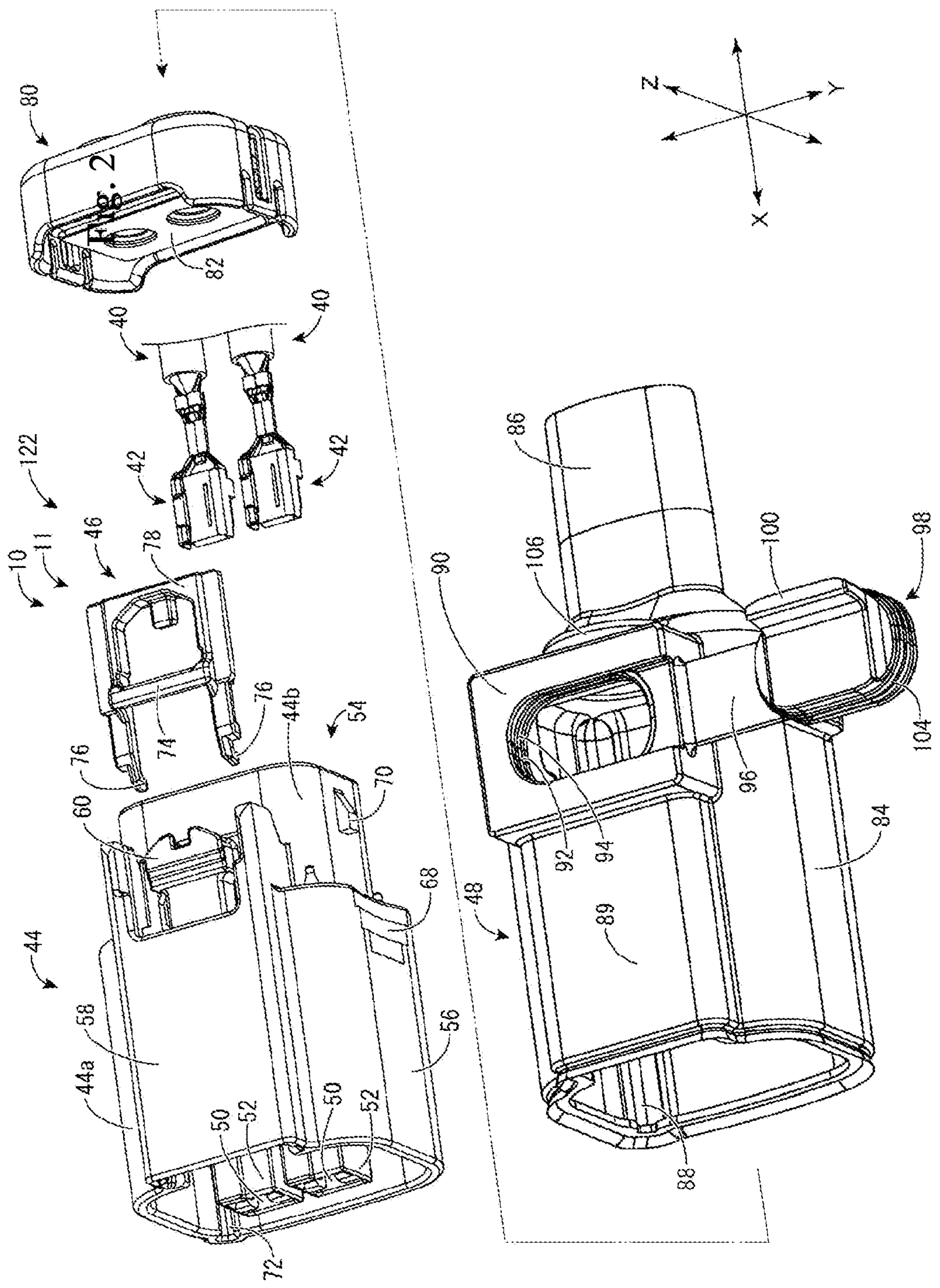
FIG. 3 is an exploded perspective view of the connector unit shown in FIG. 2.

As shown in FIG. 3, the connector unit 10 includes a connector 11 including terminal fittings 42, each of which is a female terminal fitting connected to a terminating end portion of an electric wire 40, a housing 44, which holds the terminal fittings 42, and a connector position assurance component 46, which assures proper fitting to the mating connector 12. The connector unit 10 includes a connector cover 48 having the form of a polygonal tube and covering the housing 44 of the connector 11.

Housing 44

The housing 44 is formed from a synthetic resin. As shown in FIG. 3, the housing 44 has the form of a polygonal tube that extends in the lengthwise direction and opens toward the front and rear. Terminal fitting holders 52 are formed in the housing 44 at two locations separated in the widthwise direction. The terminal fitting holders 52 include mating connector terminal fitting passage conduits 50 that receive mating connector terminal fittings (not shown) connected to terminating end portions of the terminal fitting-added electric wires 30, respectively. The terminal fittings 42 connected to the terminating end portions of the electric wires 40 are also held and accommodated in the terminal fitting holders 52. A terminal fitting passage conduit 54 that receives the terminal fittings 42 is formed in the rear side of the housing 44.

Figure 4:
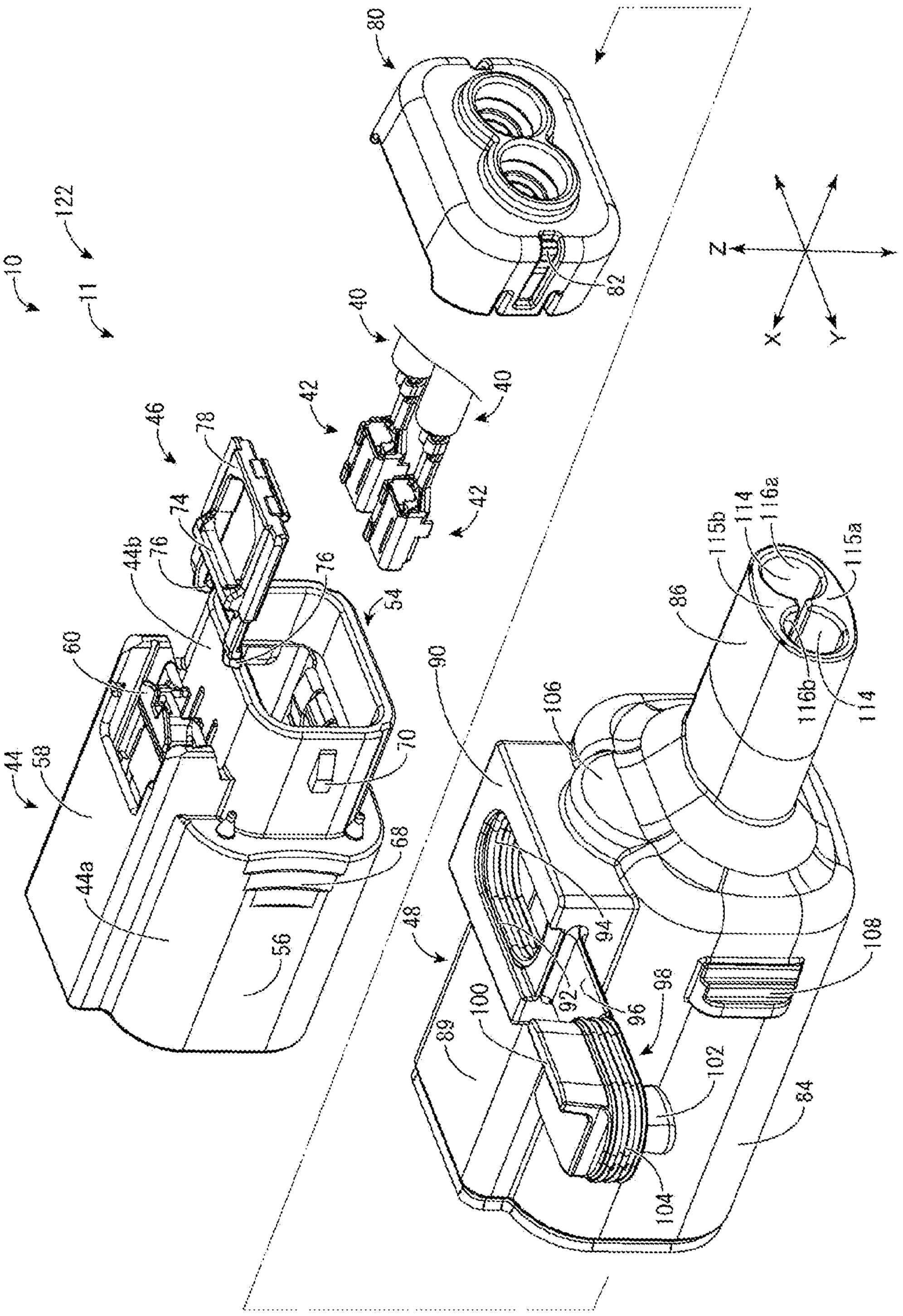
FIG. 4 is a rear exploded perspective view of the connector unit shown in FIG. 3.
Figure 7:
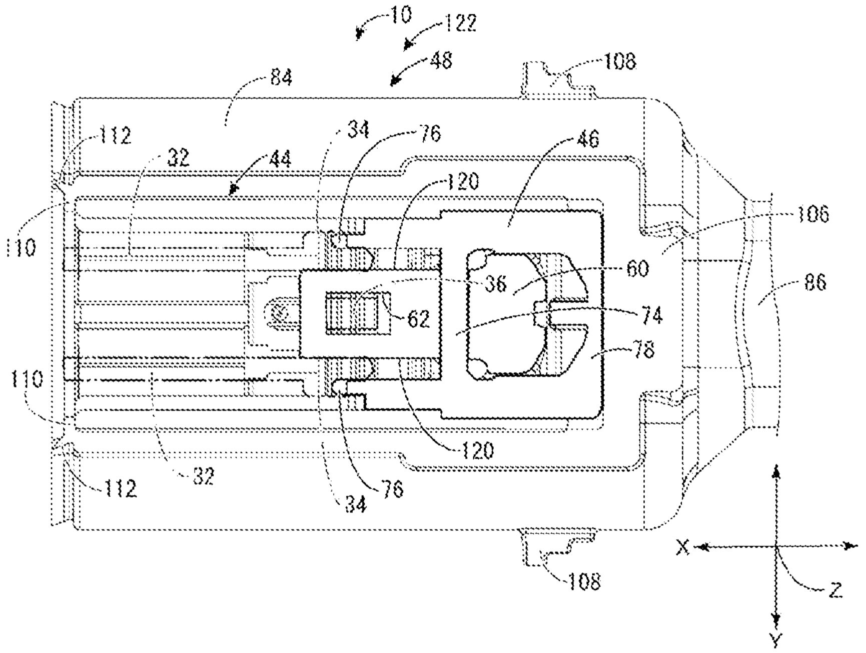
FIG. 7 is a plan view of the connector unit shown in FIG. 2 in which an upper portion of the connector unit in the Z-axis direction is cut and removed in a transverse direction, with a connector position assurance component located at a tentative engagement position.
Figure 8:
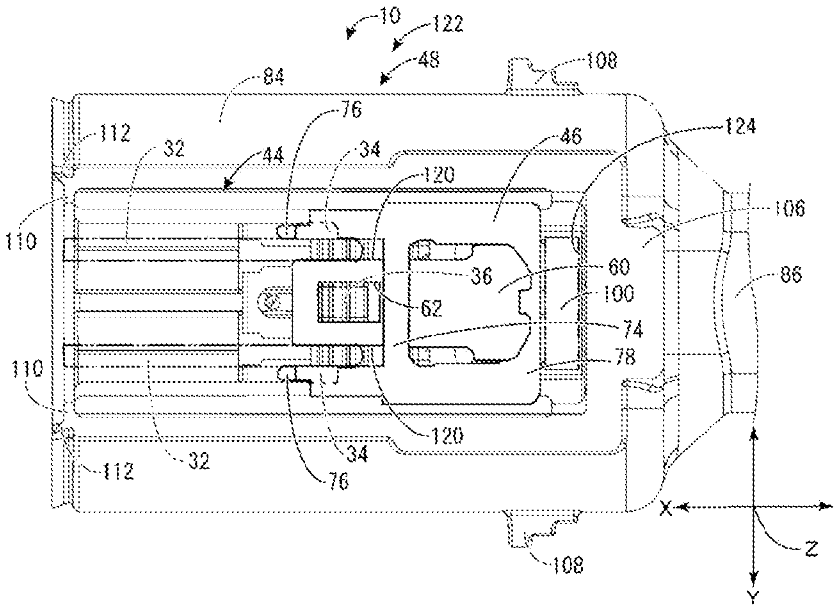
FIG. 8 is a plan view of the connector unit shown in FIG. 1 in which the upper portion of the connector unit in the Z-axis direction is cut and removed in a transverse direction, with the connector position assurance component located at a final engagement position.

As shown in FIGS. 3 and 4, the housing 44 includes a front portion 44*a* with respect to the lengthwise direction that is larger in diameter than a rear portion 44*b*. The front portion 44*a* with respect to the lengthwise direction includes a connector position assurance component accommodation portion 58. The connector position assurance component accommodation portion 58 projects upward from a middle section with respect to the widthwise direction of an upper part of a peripheral wall 56 forming the housing 44 over the entire length in the lengthwise direction. The rear side of the connector position assurance component accommodation portion 58 with respect to the lengthwise direction extends further rearward. The rear side of the connector position assurance component accommodation portion 58 with respect to the lengthwise direction is open rearward and upward. An engagement portion 60 is formed on the upper part of the peripheral wall 56 of the rear portion 44*b* of the housing 44 at the rear side of the connector position assurance component accommodation portion 58 with respect to the lengthwise direction. The engagement portion 60 projects upward and then extends toward opposite sides with respect to the lengthwise direction. As shown in FIGS. 7 and 8, the front side of the engagement portion 60 is frame-shaped and extends toward the front. The front central part of the engagement portion 60 includes an engagement hole 62 extending in the vertical direction. The rear side of the engagement portion 60 is cantilevered and has the form of a rectangular plate. The rear side of the engagement portion 60 when pushed, as will be described later, allows the engagement hole 62 and the engagement protrusion 36 to be easily disengaged from each other.

Further, as shown in FIGS. 3 and 4, in the front portion 44*a* of the housing 44 with respect to the lengthwise direction, non-slip recesses 68 are formed in the peripheral wall 56 at the rear end in parts opposed in the widthwise direction. The non-slip recesses 68 are each formed by joining three rectangular recessed parts in a side view taken in the widthwise direction. The three recessed parts of each non-slip recess 68 become deeper and longer in the vertical direction toward the rear. The non-slip recesses 68 allow the housing 44 to be held stably with the fingers when inserting the connector position assurance component 46 into the connector position assurance component accommodation portion 58. In addition, the rear portion 44*b* of the housing 44 includes engagement protrusions 70 arranged at the rear side of the peripheral wall 56 on parts opposed in the widthwise direction. The engagement protrusions 70 are used to attach a back retainer 80, which will be described later, to the rear portion 44*b* of the housing 44. Further, as shown in FIGS. 2 and 3, an accommodation recess 72 that receives the rail 38 is arranged in the peripheral wall 56 of the front portion 44*a* of the housing 44. The accommodation recess 72 is open inward and frontward at a position corresponding to the rail 38 of the mating connector housing 14 shown in FIG. 5.

Connector Position Assurance Component 46

The connector position assurance (CPA) component 46 is formed from a synthetic resin. As shown in FIG. 3, the connector position assurance component 46 has the form of a U-shaped frame and is open toward the front and in the vertical direction. A bar-shaped coupling portion 74 connects the upper surface of the connector position assurance component 46 at the central part with respect to the lengthwise direction. The front end of the connector position assurance component 46 is bent downward in an L-shaped manner to form two engagement portions 76, 76. The rear end of the connector position assurance component 46 defines an operating portion 78.

Electric Wire 40, Back Retainer 80, and Seal Member 82

The housing 44 further includes the electric wires 40, which are connected to the terminal fittings 42 and extend out of the rear end of the housing 44, the back retainer 80, which is attached to the rear end of the housing 44 and which holds the electric wires 40, and a seal member 82.

Connector Cover 48

The connector cover 48 is formed from an elastic material, for example, an elastomer such as an elastic synthetic rubber, a thermoplastic elastomeric, or the like. As shown in FIGS. 3 and 4, the connector cover 48 has the form of a polygonal tube that extends in the lengthwise direction and opens toward the front and rear. The connector cover 48 has a front side that is larger in diameter than a rear side. The front side of the connector cover 48 defines a housing holder 84 that accommodates and holds the housing 44 of the connector unit 10. The rear side of the connector cover 48 defines an electric wire passage tube 86. The electric wires 40 connected to the terminal fittings 42 and extended toward the rear are held and accommodated in the electric wire passage tube 86.

Figure 11:
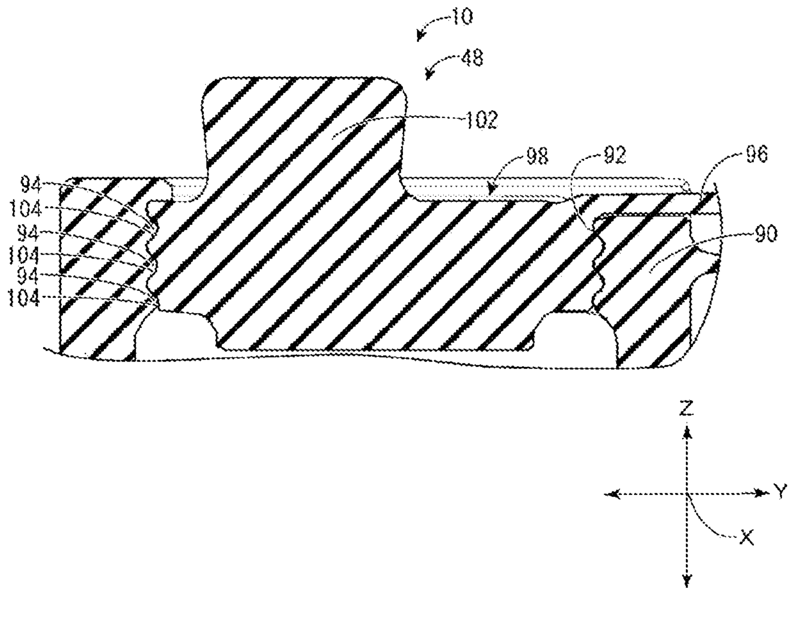
FIG. 11 is an enlarged cross-sectional view taken along line XI-XI in FIG. 6.

As shown in FIG. 3, the housing holder 84 at the front side of the connector cover 48 includes a recess accommodation portion 88. The recess accommodation portion 88 is open frontward and inward at a part corresponding to the accommodation recess 72 of the housing 44. Further, an accommodation portion 89 is arranged on the front side of the upper surface of the housing holder 84 to accommodate the connector position assurance component accommodation portion 58 of the housing 44. The accommodation portion 89 is open frontward and inward and has the form of a rectangular block projecting upward. Further, a projection 90 that has the form of a rectangular block projects upward from the rear side of the housing holder 84. A window 92 that opens upward and into the housing holder 84 extends through the central portion of the projection 90. The window 92 has a substantially rectangular cross section. As shown in FIGS. 1 and 2, the window 92 is formed to expose the connector position assurance component 46 to the outside of the connector cover 48. Thus, the connector position assurance component 46 arranged on the housing 44 is visible and can be checked through the window 92 even when the connector cover 48 is attached to the housing 44 of the connector 11. As shown in FIG. 11, the window 92 has an inner edge surface that includes a looped ridge 94 having a substantially triangular cross section projecting inward and extending in the looping direction. There is more than one ridge 94 (three in the present embodiment) spaced apart in the vertical direction (Z-axis direction as viewed in the drawing). The inner edge surface of the window 92 refers to the surface defining the opening of the window 92 and extending in the open direction (Z-axis direction as viewed in the drawing) of the window 92. In the direction that orthogonally intersects the X-axis direction, the vertical direction (Z-axis direction as viewed in the drawing) refers to the open direction of the window 92 of the connector unit 10 and the opposite direction.

Additionally, a lid 98 is coupled by a coupling portion 96 to the projection 90 at a side surface in the widthwise direction. The lid 98 has a bottom surface (surface located at upper side in vertical direction and extending in X-axis direction and Y-axis direction as viewed in FIG. 4) where a detection rib 100, which has the form of a rectangular plate, is arranged at the rear side over the entire length in the widthwise direction. The lid 98 has a top surface (surface located at lower side in vertical direction and extending in X-axis direction and Y-axis direction as viewed in FIG. 4) where a holding protrusion 102 having the form of a circular tube is arranged at the central portion. This facilitates the attachment and detachment of the lid 98, and improves operability for attaching and detaching the lid 98 to and from the window 92. Further, the outer edge surface of the lid 98 includes a looped valley 104 having a substantially triangular cross section projecting outward and extending in the looping direction. There is more than one valley 104 (three in the present embodiment) spaced apart in the vertical direction (Z-axis direction). The coupling portion 96 of the lid 98 has the form of a thin rectangular plate and is bendable in a thickness-wise direction or the like. The lid 98 can easily be fitted into the window 92 from the side of the detection rib 100. That is, the lid 98 can freely open and close the window 92. As shown in FIG. 11, when the window 92 is closed by the lid 98, the ridges 94 in the inner edge surface of the window 92 project toward the outer edge surface of the lid 98. The valleys 104 in the outer edge surface of the lid 98 accommodate the ridges 94 in a state contacting the ridges 94. This improves the seal between the contacting surfaces of the lid 98 and the window 92 and improves the water resistance of the connector cover 48. This also limits unexpected separation of the lid 98 from the window 92.

As shown in FIG. 4, a pushing portion 106 having an arcuate shape bulged upwardly is arranged at the rear side of the projection 90 including the window 92 of the connector cover 48. The pushing portion 106 is formed so that it can easily be deformed when pushed in the lengthwise direction. For example, as shown in FIG. 2, the pushing portion 106 is located at a position opposing the operating portion 78, which is defined by the rear end of the connector position assurance component 46. The pushing portion 106 is pushed forward with respect to the lengthwise direction from outside the connector cover 48 to push the operating portion 78. This allows the operating portion 78 to be pushed from outside the connector cover 48 even if the operating portion 78 is covered by the connector cover 48 and not visible. Accordingly, the assembling efficiency of the connector unit 10 is improved.

Figure 6:
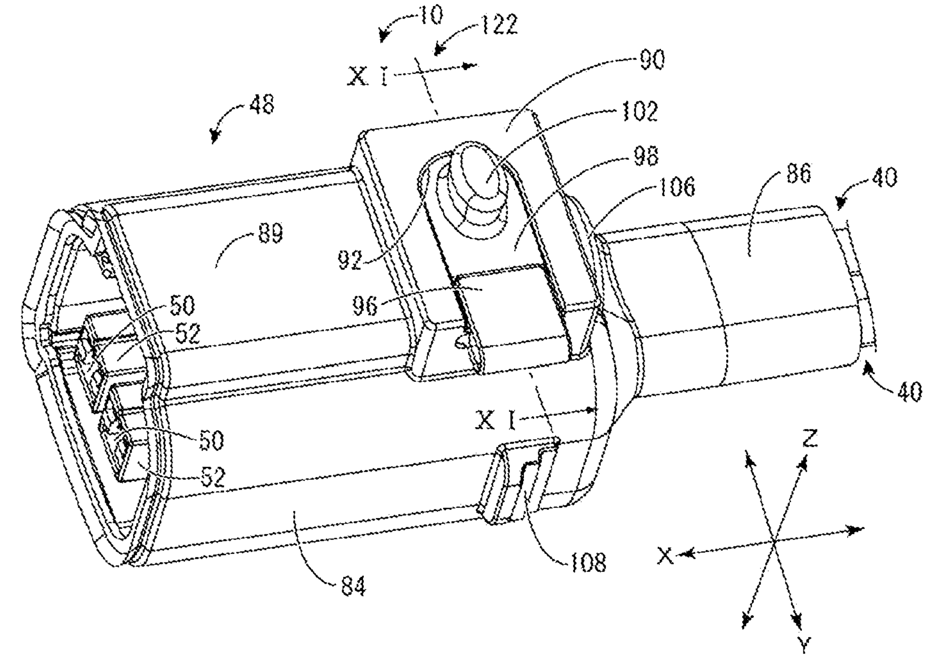
FIG. 6 is a perspective view showing a window in the connector unit of FIG. 2 in a closed state.

As shown in FIGS. 4 and 6, a support 108 is arranged on each of the two side surfaces of the housing holder 84 of the connector cover 48 at the rear end. More specifically, the supports 108 are arranged on the side surfaces of the connector cover 48 in a direction (in present embodiment, widthwise direction) intersecting the direction in which the connector unit 10 is fitted to the mating connector 12 (in present embodiment, frontward in lengthwise direction). This allows the pushing force in the direction in which the connector unit 10 is fitted to the mating connector 12 to be stably transmitted to the connector unit 10 when fitting the connector unit 10 to the mating connector 12. Thus, the assembling efficiency of the connector unit 10 is improved. In addition, the supports 108 are each formed so that its projected height increases in a stepped manner from the outer surface of the connector cover 48 toward the side fitted to the mating connector 12 (i.e., frontward in lengthwise direction). In this manner, the supports 108 are shaped so that one can place his or her fingers along the supports 108 to stably push the supports 108. The projecting height of each support 108 gradually increases toward the side fitted to the mating connector 12.

Figure 9:
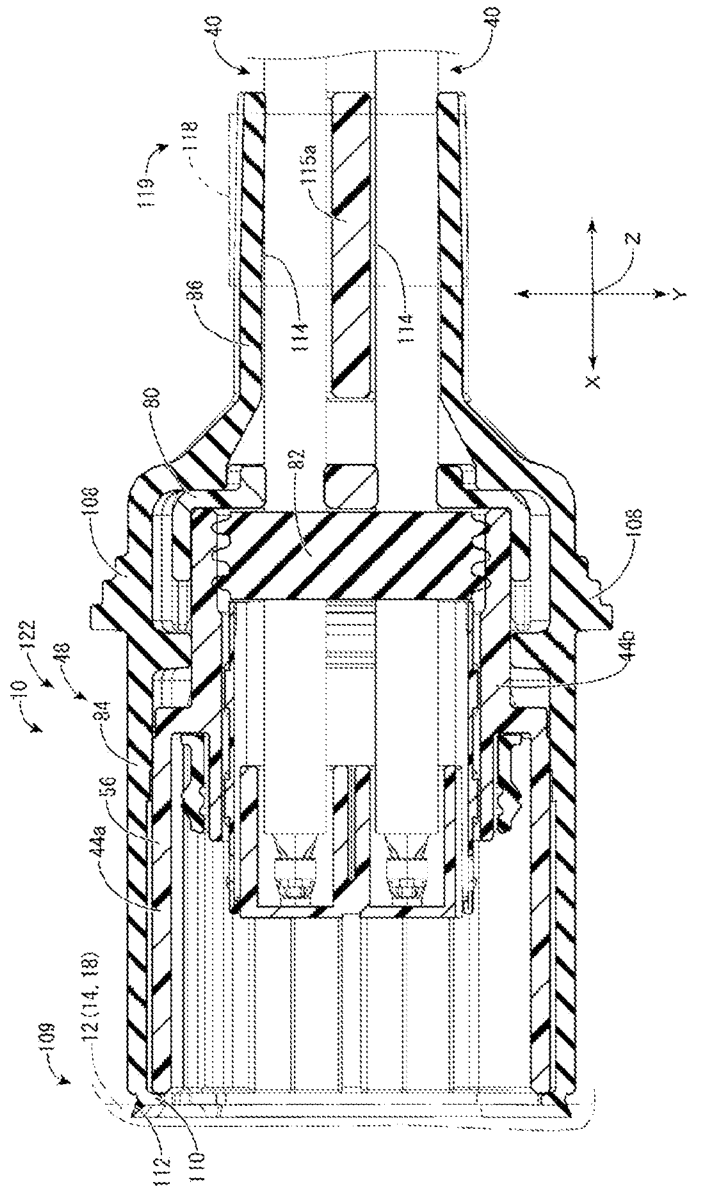
FIG. 9 is an enlarged transverse cross-sectional view of the connector unit shown in FIG. 2 in which a middle portion of the connector unit in the Z-axis direction is cut in a transverse direction.
Figure 10:
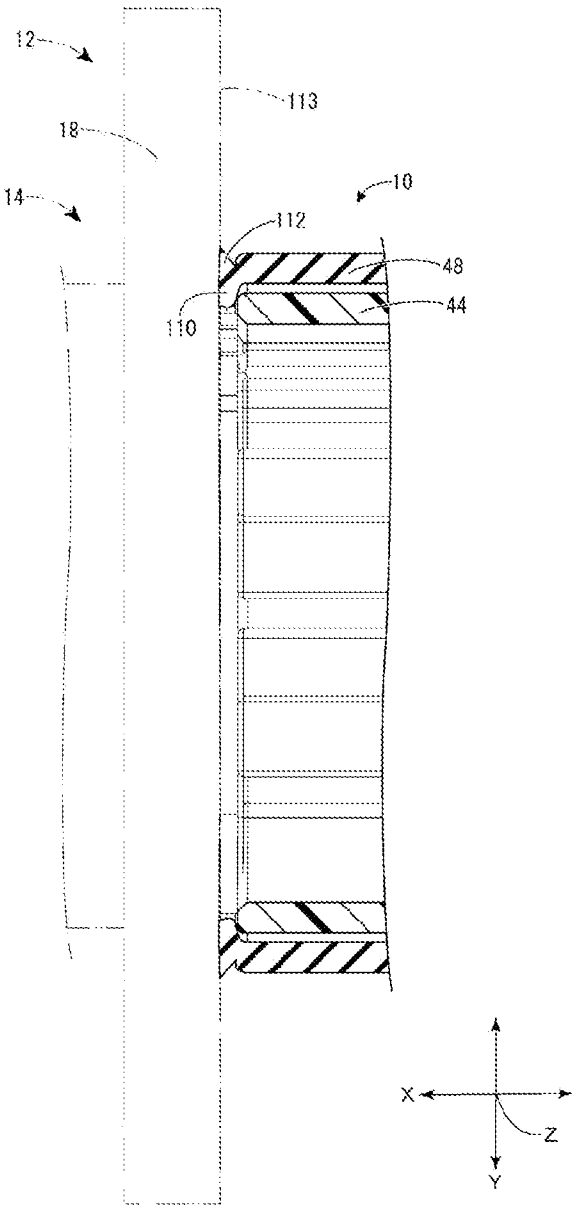
FIG. 10 is an enlarged view of a portion where the mating connector and the connector unit shown in FIG. 9 are fitted together.

As shown in FIGS. 7 to 10, the edge around the front opening in a first end 109, or the front end, of the housing holder 84 of the connector cover 48 includes a positioning portion 110 and a looped seal portion 112. More specifically, the flange-shaped positioning portion 110 that projects inwardly extends along the entire edge of the front opening in the connector cover 48. As shown in FIG. 9, contact of the positioning portion 110 with the entire edge of the front opening in the front portion 44*a* of the housing 44 allows for easy positioning of the housing 44 and the connector cover 48. Accordingly, the assembling efficiency of the connector unit 10 is improved. The looped seal portion 112 can easily contact the rear surface 113 of the mating connector 12. Further, the looped seal portion 112 is arranged along the entire outer edge of the positioning portion 110. The looped seal portion 112 has a tapered shape so as to be enlarged in diameter toward the mating connector 12 (frontward in lengthwise direction). The looped seal portion 112 of the connector unit 10 contacts the rear surface 113 of the mating connector 12 when the connector unit 10 is fitted to the mating connector 12. The distal end of the looped seal portion 112 is enlarged in a direction extending away from the center axis of the looped seal portion 112 when the mating connector 12 comes into contact with the rear surface 113. This increases the area of contact with the rear surface 113 of the mating connector 12 and improves the seal of the looped seal portion 112.

As shown in FIGS. 4 and 9, the electric wire passage tube 86 of the connector cover 48 includes two electric wire passage conduits 114 that open toward the front and rear. The two electric wire passage conduits 114 have circular cross sections, extend in the lengthwise direction, and are separated from each other in the widthwise direction. Thus, the electric wires 40 respectively connected to the two terminal fittings 42 extend through the electric wire passage tube 86 of the connector cover 48. A first partition wall 115*a* and a second partition wall 115*b*, which are partition walls that contact the outer surface of each electric wire 40, are arranged between the two electric wire passage conduits 114 in the electric wire passage tube 86. The first partition wall 115*a* and the second partition wall 115*b* arranged on the inner surface are located between the two electric wires 40 and define a passage region through which each of the electric wires 40 passes. This avoids interference between the two electric wires 40 while stably holding each of the electric wires 40 in the electric wire passage tube 86. Further, gaps that may be formed between the electric wires 40 when passing the two electric wires 40 through the electric wire passage tube 86 are eliminated by the first partition wall 115*a* and the second partition wall 115*b* located between the electric wires 40. This provides water resistance between the electric wires 40 which would be an issue when passing the electric wires 40 through the electric wire passage tube 86. Further, the inner surface of the electric wire passage tube 86 includes a first surface 116*a* and a second surface 116*b* opposing each other in the vertical direction and sandwiching the two electric wires 40, which are arranged next to each other. The first surface 116*a* projects toward the second surface 116*b* and includes the first partition wall 115*a*, which is located between the two electric wires 40 and contact the outer surface of each electric wire 40. The second surface 116*b* projects toward the first surface 116*a* and includes the second partition wall 115*b*, which is located between the two electric wires 40 and contact the outer surface of each electric wire 40.

As shown in FIG. 9, the electric wires 40, subsequent to passage, are tied and fixed by a tying member 118 or the like at the rear side of the electric wire passage tube 86. This results in the projecting end of the first partition wall 115*a* contacting and joining the projecting end of the second partition wall 115*b* so as to define the electric wire passage conduits 114 through which the electric wire 40 pass. In this manner, the projecting end of the first partition wall 115*a* and the projecting end of the second partition wall 115*b* are not coupled at the inner surface of the electric wire passage tube 86 and are separable from the inner surface. Thus, the arrangement and passage of the two electric wires 40 through the electric wire passage tube 86 can be performed with the single electric wire passage tube 86. More specifically, the projecting end of the first partition wall 115*a* is separated from the projection end of the second partition wall 115*b* so that the two electric wire passage conduits 114 can be connected to each other. This facilitates the task for passing the electric wire 40 through the electric wire passage conduits 114. Further, as described above, the electric wire 40, subsequent to passage, are tied and fixed at the rear side of the electric wire passage tube 86 by the tying member 118. This improves the water resistance and dust resistance of the electric wire passage tube 86. More specifically, the tying member 118 is fixed to the outer surface of the electric wire passage tube 86 so that the inner surface of the electric wire passage tube 86 contacts the outer surfaces of the electric wires 40. Further, the electric wire passage tube 86, through which the electric wires 40 pass, includes a first end 109, which is the front end (left end in FIG. 9) of the connector cover 48, and a second end 119, which is located at the opposite side (right side in FIG. 9) in the lengthwise direction. The inner surface of the electric wire passage tube 86 is in tight contact with the outer surfaces of the electric wires 40. The inner surface of the electric wire passage tube 86 includes the surfaces forming the partition walls, namely, the first partition wall 115*a* and the second partition wall 115*b*. Thus, the looped seal portion 112 provides the connector cover 48 with water resistance at the side of the first end 109. Contact of the inner surface of the electric wire passage tube 86 with the outer surfaces of the electric wires 40 provides the connector cover 48 with water resistance at the side of the second end 119. This further improves the water resistance of the connector cover 48.

An assembling method of the present embodiment will now be described. First, the rear end of each electric wire 40 is passed in advance through the connector cover 48, the back retainer 80, and the seal member 82 in this order. Then, the terminal fittings 42 are prepared to conductively connect the terminal fittings 42 to the terminating end portions of the electric wires 40. The terminal fittings 42 connected to the two electric wires 40 in this manner are inserted from the terminal fitting passage conduit 54 deep into the terminal fitting holders 52. Consequently, the rear ends of the terminal fittings 42 are engaged with retainers arranged in the terminal fitting holders 52. This stably accommodates and holds the terminal fittings 42 in the terminal fitting holders 52. Then, the back retainer 80 and the seal member 82 are moved toward the housing 44 so that the back retainer 80 engages the engagement protrusions 70 of the housing 44. This fixes the back retainer 80 to the rear portion 44*b* of the housing 44. Then, after inserting the connector position assurance component 46 into the connector position assurance component accommodation portion 58 of the housing 44, the connector cover 48 is moved toward the housing 44 to cover the housing 44. Here, the connector position assurance component accommodation portion 58 is in tight contact with and accommodated in the accommodation portion 89, which is defined by the inner surface of the connector cover 48 to accommodate the connector position assurance component accommodation portion 58. The accommodation portion 89 is arranged on the outer surface of the housing 44 that contacts the inner surface of the connector cover 48. The connector position assurance component accommodation portion 58 projects from the upper part of the outer surface of the housing 44 toward the inner surface of the connector cover 48. Thus, the connector cover 48 will not be erroneously coupled in a manner upside down or the like to the housing 44.

As shown in FIG. 9, the positioning portion 110, which is arranged on the front end of the housing holder 84 of the connector cover 48 is engaged with the front end of the front portion 44*a* of the housing 44. The rear end of the housing holder 84 of the connector cover 48 is engaged with the rear surface of the back retainer 80. This positions and fixes the connector cover 48 to the housing 44. As shown in FIG. 9, the inner surface of the connector cover 48 is reduced in diameter at the rear end of the front portion 44*a* of the housing 44 and the front side of the rear portion 44*b* of the housing 44. This allows the inner surface of the connector cover 48 to contact the outer surface of the housing 44. As a result, the pushing portion 106 contacts the operating portion 78 of the connector position assurance component 46 as shown in FIG. 7. This positions the connector position assurance component 46 at a tentative engagement position, which is an initial position. As shown in FIG. 7, in this state, two accommodation recesses 120 that are open frontward and upward to accommodate the two rails 32, 32, which are arranged on the upper surface of the mating connector housing 14, extend between the connector position assurance component 46 and the front side of the engagement portion 60. As shown in FIG. 2, this completes a wire harness 122 in accordance with the first embodiment of the present disclosure that includes the connector unit 10 and the electric wires 40, which are connected to the connector 11 of the connector unit 10.

Finally, the connector unit 10 is coupled to the mating connector 12. More specifically, the two rails 32, 32 and the rail 38, which are arranged on the outer surface of the mating connector housing 14, are accommodated in the two accommodation recesses 120 and the accommodation recess 72, which are arranged in the front portion 44*a* of the housing 44 of the connector unit 10. Thus, the connector unit 10 will not be erroneously coupled in a manner upside down or the like to the mating connector housing 14. As shown in FIG. 7, in this state, the two rails 32 are inserted in the two accommodation recesses 120, and the engagement portions 76, which are arranged on the front end of the connector position assurance component 46, are disposed on the sloped surfaces of the engagement projections 34. Further, the engagement protrusion 36, which is arranged on the mating connector housing 14, is fitted to the engagement hole 62 of the engagement portion 60 to fix the connector unit 10 to the mating connector 12. The fixed state can be easily cancelled by pushing the rear side of the engagement portion 60. Then, the pushing portion 106 of the connector cover 48 is pushed toward the front to engage and securely fix the engagement portions 76 with the engagement projection 34.

The operating portion 78 of the connector position assurance component 46 is inserted into the rear lower side of the engagement portion 60 so that the fixed state cannot be cancelled (refer to FIGS. 7 and 8 and 1 and 2). As shown in FIGS. 1 and 8, in this state, a detection rib accommodation recess 124 is formed between the pushing portion 106 and the operating portion 78 of the connector position assurance component 46. This accommodates the detection rib 100 in the detection rib accommodation recess 124 and allows the lid 98 to close the window 92. In this manner, the detection rib 100 of the lid 98 projects toward the housing 44. Thus, when the connector position assurance component 46 is located at the final engagement position assuring proper fitting, the detection rib 100 does not interfere with the connector position assurance component 46, which is located at the final engagement position, and allows the lid 98 to be fitted to the window 92. When the connector position assurance component 46 is not located at the final engagement position assuring proper fitting, the detection rib 100 interferes with the connector position assurance component 46 so that the lid 98 cannot be fitted to the window 92. In this manner, the detection rib 100 is arranged at a position satisfying a predetermined condition. More specifically, the predetermined condition is in that the detection rib 100 interferes with the connector position assurance component 46 when the connector position assurance component 46 is located at a first position that differs from a second position that is the final engagement position. When the connector position assurance component 46 is located at the second position, the detection rib 100 does not interfere with the connector position assurance component 46. The connector position assurance component 46 is movable from the predetermined first position to the second position.

This avoids errors such as the connector position assurance component 46 not being checked or the lid 98 being inadvertently closed. Additionally, when the window 92 is closed by the lid 98, this allows for easy recognition that the connector position assurance component 46 is located at the final engagement position assuring proper fitting. This improves the assembling efficiency and assembling reliability of the connector unit 10. This completes the coupling of the connector unit 10 to the mating connector 12. When fitted to the mating connector 12, the looped seal portion 112 of the connector cover 48 is in tight contact with the rear surface 113 of the mating connector housing 14. That is, when fitted to the mating connector 12, the looped seal portion 112 is arranged at a position where it can contact the rear surface 113 at the rear side of the mating connector 12.

With the connector unit 10 of the present disclosure having such a structure, when fitted to the mating connector 12 of the connector unit 10, the looped seal portion 112 of the connector unit 10 contacts the rear surface 113 of the mating connector 12. In this state, the gap between the connector cover 48 and the rear surface 113 of the mating connector 12 is sealed. This improves water resistance at the side of the connector unit 10 fitted to the mating connector 12. Further, when in use, foreign matter such as mud collected around the connector cover 48 will not enter the connector cover 48. Moreover, during maintenance or the like, when fitting or removing the connector unit 10 to or from the mating connector 12, since foreign matter will not enter the housing 44, defects caused by such foreign matter will not occur when refitting the connector unit 10 to the mating connector 12.

The wire harness 122 includes the connector unit 10 and the electric wires 40, which are connected to the connector 11 of the connector unit 10. Thus, the same advantages as the connector unit 10 described above are obtained with the wire harness 122 that includes the connector unit 10.

With the connector unit 10 and the connector fitting structure fitting the connector unit 10 to the mating connector 12, the looped seal portion 112 of the connector unit 10 contacts the rear surface 113 of the mating connector 12 when the connector unit 10 is fitted to the mating connector 12. Thus, the connector fitting structure has the same advantages as the connector unit 10.

There is no limitation to the technology described in this specification and the embodiment illustrated with the drawings. For example, the embodiments described below are included in the technical scope described in this specification.

Figure 12:
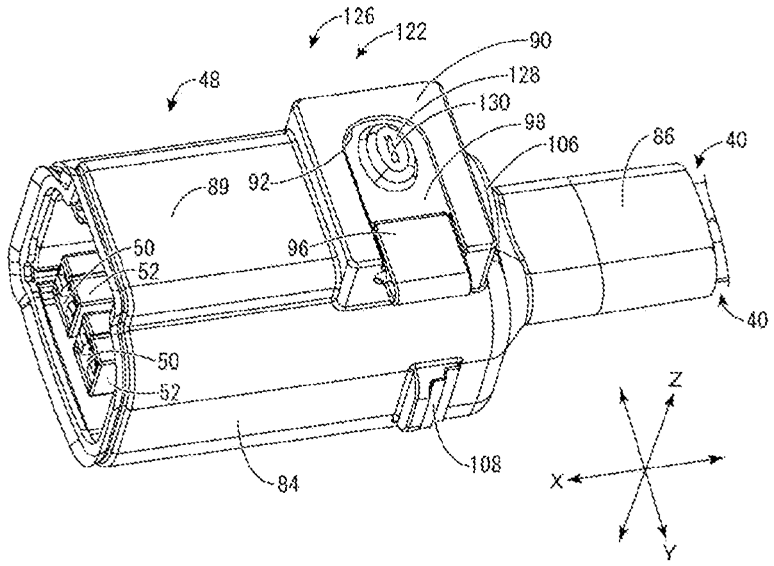
FIG. 12 is a perspective view showing a window in a second embodiment of the connector unit and corresponding to FIG. 6.

(1) In the first embodiment, the holding protrusion 102 is arranged on the top surface of the lid 98 and sized for easy holding with the fingers but not limited in such a manner. FIG. 12 shows a connector unit 126 according to a second embodiment of the present disclosure including a holding protrusion 128 that is sized such that it would be difficult to be held with the fingers. For example, the holding protrusion 128 may include a slit-shaped recess 130 that allows for engagement with a tool (not shown). In this manner, one cannot hold the holding protrusion 128 with his or her fingers because of its size, and a tool is inserted in the recess 130 to hold the holding protrusion 128. As a result, the projecting height of the holding protrusion 128 can be reduced to limit interference of the holding protrusion 128 with other members. Further, unintentional separation of the lid 98 from the window 92 can be avoided. This improves the water resistance and the reliability of the protective functionalities such as shielding of the connector cover 48.

(2) In the first embodiment, the partition walls contacting the outer surfaces of the electric wires 40 include the first partition wall 115*a*, which projects from the first surface 116*a*, and the second partition wall 115*b*, which projects from the second surface 116*b*, but are not limited in such a manner. The partition wall may project from only one of the first surface 116*a* and the second surface 116*b*. Further, there may be any number of partition walls with any projecting height.

(3) In the first embodiment, the inner edge surface of the window 92 includes the ridges 94, and the outer edge surface of the lid 98 includes the valleys 104. Instead, valleys may be arranged in the inner edge surface of the window 92, and ridges may be arranged on the outer edge surface of the lid 98.

(4) In the first embodiment, the inner surface of the connector cover 48 includes the recess accommodation portion 88, and the outer surface of the housing 44 includes the accommodation recess 72. Instead, the inner surface of the connector cover 48 may include the accommodation recess 72, and the outer surface of the housing 44 may include the recess accommodation portion 88.

DESCRIPTION OF THE REFERENCE CHARACTERS

10 connector unit (first embodiment)
11 connector
12 mating connector
14 mating connector housing
16 front open portion
18 fixed portion
20 through hole
22 front surface
24 rubber seal
26 mating connector electric wire insertion portion
28 mating connector electric wire passage conduit
30 terminal fitting-added electric wire
32 rail
34 engagement projection
36 engagement protrusion

38 rail
40 electric wire
42 terminal fitting
44 housing
44*a* front portion
44*b* rear portion
46 connector position assurance component
48 connector cover
50 mating connector terminal fitting passage conduit
52 terminal fitting holder
54 terminal fitting passage conduit
56 peripheral wall
58 connector position assurance component accommodation portion
60 engagement portion
62 engagement hole
68 non-slip recess
70 engagement protrusion
72 accommodation recess
74 coupling portion
76 engagement portion
78 operating portion
80 back retainer
82 seal member
84 housing holder
86 electric wire passage tube
88 recess accommodation portion
89 accommodation portion
90 projection
92 window
94 ridge
96 coupling portion
98 lid
100 detection rib
102 holding protrusion
104 valley
106 pushing portion
108 support
109 first end
110 positioning portion
112 looped seal position
113 rear surface
114 electric wire passage conduit
115*a* first partition wall (partition wall)
115*b* second partition wall (partition wall)
116*a* first surface
116*b* second surface
118 tying member
119 second end
120 accommodation recess
122 wire harness
124 detection rib accommodation recess
126 connector unit (second embodiment)
128 holding protrusion
130 recess

The invention claimed is:

1. A connector unit, comprising:
a connector including a terminal fitting that is connected to a terminating end portion of an electric wire and a housing that holds the terminal fitting; and
a tubular connector cover that covers the housing and is formed from an elastic material, wherein
the connector cover includes a looped seal portion,
the looped seal portion is arranged at a position allowing for contact with a surface of a mating connector in a state fitted to the mating connector,
the connector includes a connector position assurance component assuring proper fitting to the mating connector; and
the connector cover includes a window that exposes the connector position assurance component to the outside of the connector cover and a lid that freely opens and closes the window.

2. The connector unit according to claim 1, wherein the looped seal portion has a tapered shape so as to be enlarged in diameter toward the mating connector.

3. The connector unit according to claim 1, wherein:
the connector cover includes a positioning portion that positions the connector cover on the housing; and
the positioning portion contacts the housing to position the connector cover.

4. The connector according to claim 1, wherein:
the window has an inner edge surface that includes a ridge;
the lid has an outer edge surface that contacts the inner edge surface and includes a valley;
the ridge projects toward the outer edge surface; and
the valley accommodates the ridge in a state contacting the ridge.

5. The connector unit according to claim 1, wherein:
the connector cover includes a first end, including the looped seal portion, and a second end, at a side opposite the first end;
the second end of the connector cover includes an electric wire passage tube through which the electric wire connected to the terminal fitting extends; and
the electric wire passage tube includes an inner surface that is in tight contact with an outer surface of the electric wire.

6. The connector according to claim 5, wherein:
the terminal fitting held by the housing includes a plurality of terminal fittings;
the electric wire includes a plurality of electric wires;
the electric wires are connected to the terminal fittings and extend through the electric wire passage tube of the connector cover;
the electric wire passage tube includes a partition wall located between the electric wires and arranged on the inner surface; and
the partition wall includes a projecting end that is separable from the inner surface, and the partition wall defines a passage region that contacts outer surfaces of each of the electric wires passing therethrough.

7. The connector unit according to claim 5, further comprising:
a tying member fixed to the electric wire passage tube,
wherein the tying member has the inner surface of the electric wire passage tube contact the outer surface of the electric wire.

8. A connector fitting structure, comprising:
the connector unit according to claim 1; and
a mating connector fitted to the connector unit,
wherein the looped seal portion of the connector unit contacts a surface of the mating connector in a state in which the connector unit is fitted to the mating connector.

9. A wire harness, comprising:
a connector unit including
a connector including a terminal fitting that is connected to a terminating end portion of an electric wire and a housing that holds the terminal fitting, and
a tubular connector cover that covers the housing and is formed from an elastic material, wherein the connector cover includes a looped seal portion, the looped seal portion is arranged at a position allowing for contact with a surface of a mating connector in a state fitted to the mating connector;

the electric wire connected to the terminal fitting of the connector unit, the connector includes a connector position assurance component assuring proper fitting to the mating connector; and the connector cover includes a window that exposes the connector position assurance component to the outside of the connector cover and a lid that freely opens and closes the window.

* * * * *